United States Patent [19]

Billett et al.

[11] 4,129,230

[45] Dec. 12, 1978

[54] TABLET DISPENSER

[75] Inventors: Ronald J. Billett, Sunnyvale; Bruce M. Harper, San Jose, both of Calif.

[73] Assignee: FMC Corporation, San Jose, Calif.

[21] Appl. No.: 538,987

[22] Filed: Jan. 6, 1975

[51] Int. Cl.² .............................................. B65G 1/08
[52] U.S. Cl. ................................... 221/268; 221/232; 221/281; 422/266
[58] Field of Search ................... 221/1, 135, 154, 268, 221/276, 232, 281, 282; 222/190; 210/169; 23/267 A, 267 B, 267 D, 267 E, 267 R, 267 F, 272.7, 272.8

[56] References Cited

U.S. PATENT DOCUMENTS

| 914,320 | 3/1909 | Smith | 221/276 X |
|---|---|---|---|
| 961,789 | 6/1910 | Mussey | 23/267 A |
| 2,620,061 | 12/1952 | Uxa | 221/281 X |
| 2,684,783 | 7/1954 | Ahlstrom | 221/264 X |
| 2,759,632 | 8/1956 | Ussery et al. | 221/154 X |
| 3,233,778 | 2/1966 | Cobb et al. | 221/232 |

Primary Examiner—Joseph J. Rolla
Attorney, Agent, or Firm—R. S. Kelly

[57] ABSTRACT

A self-enclosed tablet dispenser for dispensing tablets into liquid-filled containers, such as swimming pools, including a first tube to hold the tablets, a base connected to the first tube with a horizontal passageway in which a plunger slidably reciprocates to move the tablet from the bottom of the first tube at one end of the passageway to the other end of the passageway, and a second tube connected to the base at the other end of the passageway to guide the tablet into the liquid by gravity means. The second tube may be open-ended on the bottom, or it may be closed so as to hold the tablets while allowing the liquid to enter and thus dissolve the tablets.

3 Claims, 6 Drawing Figures

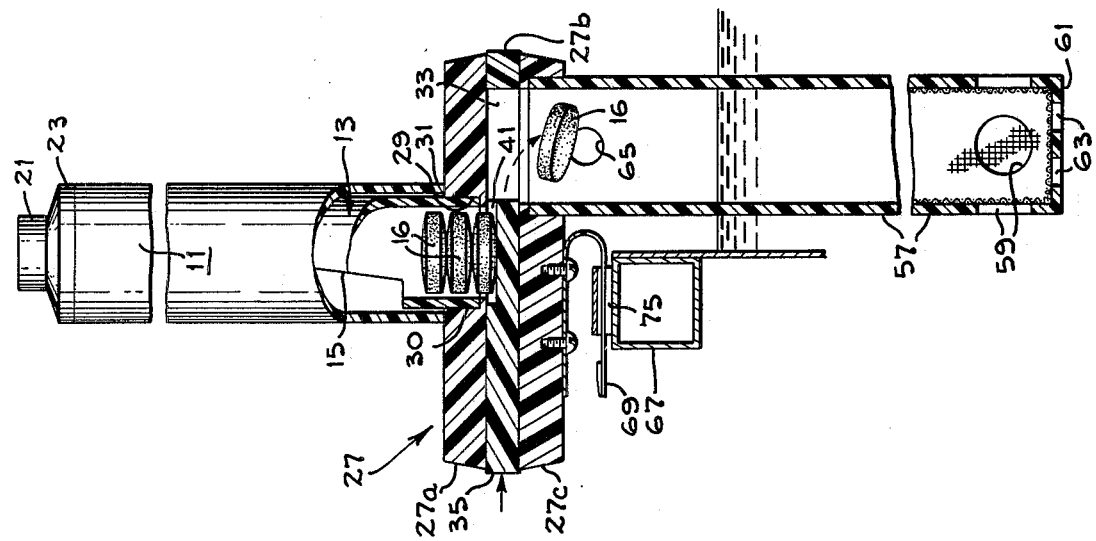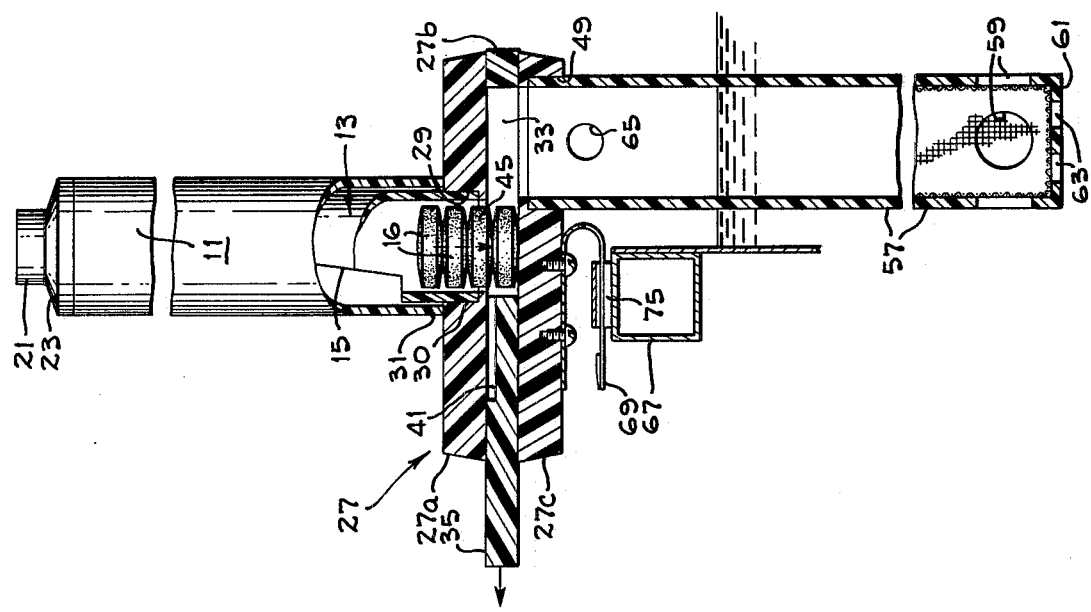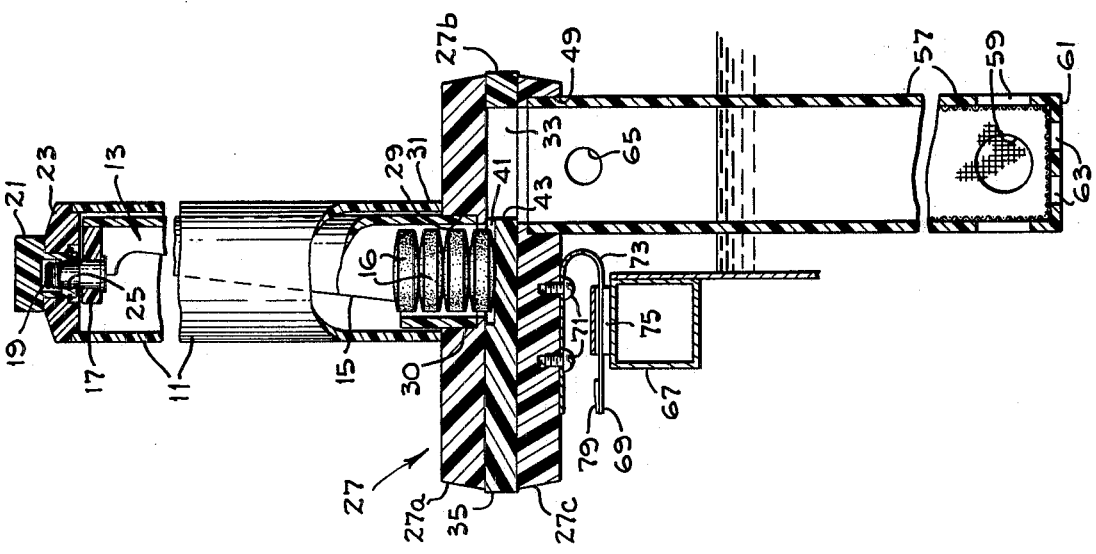

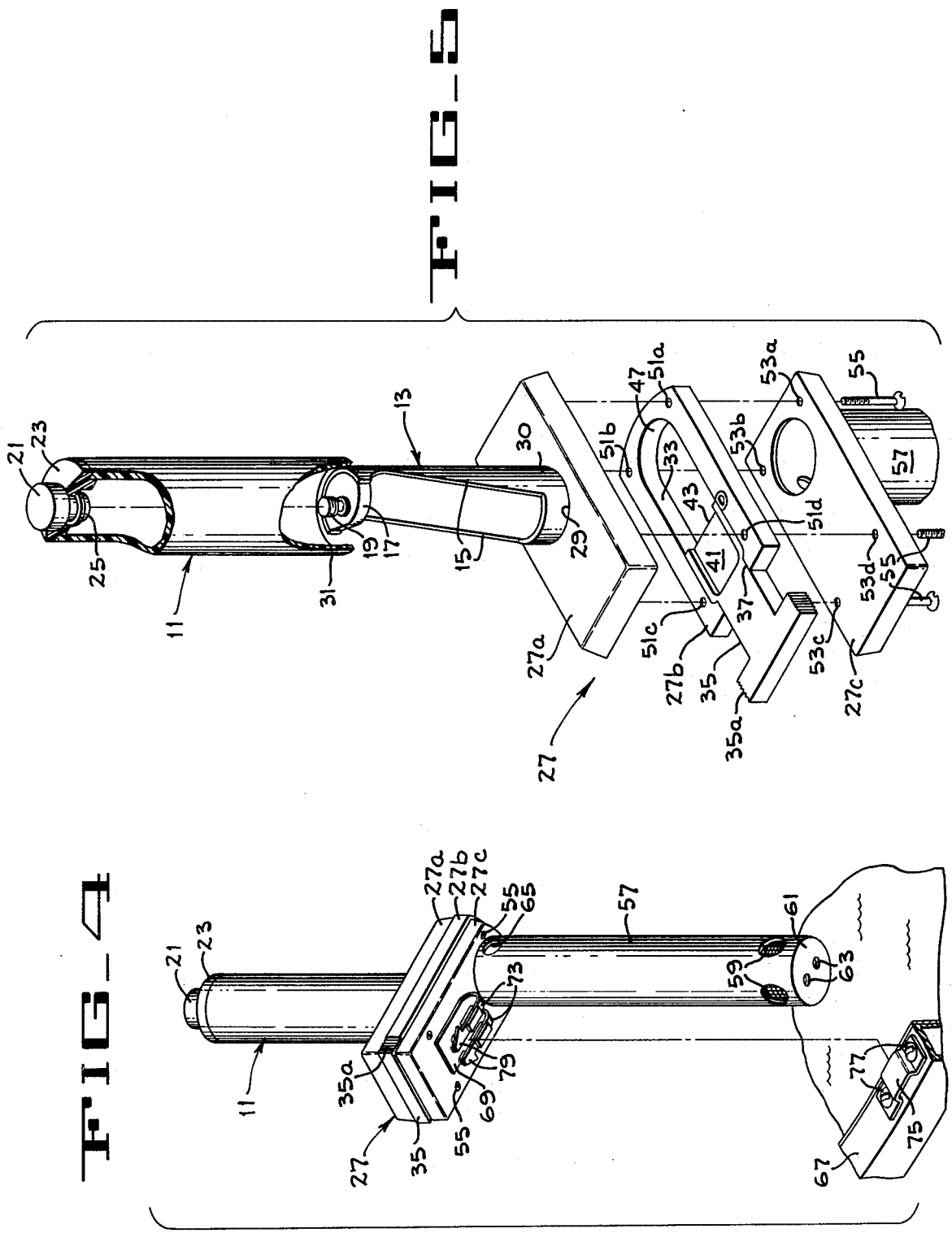

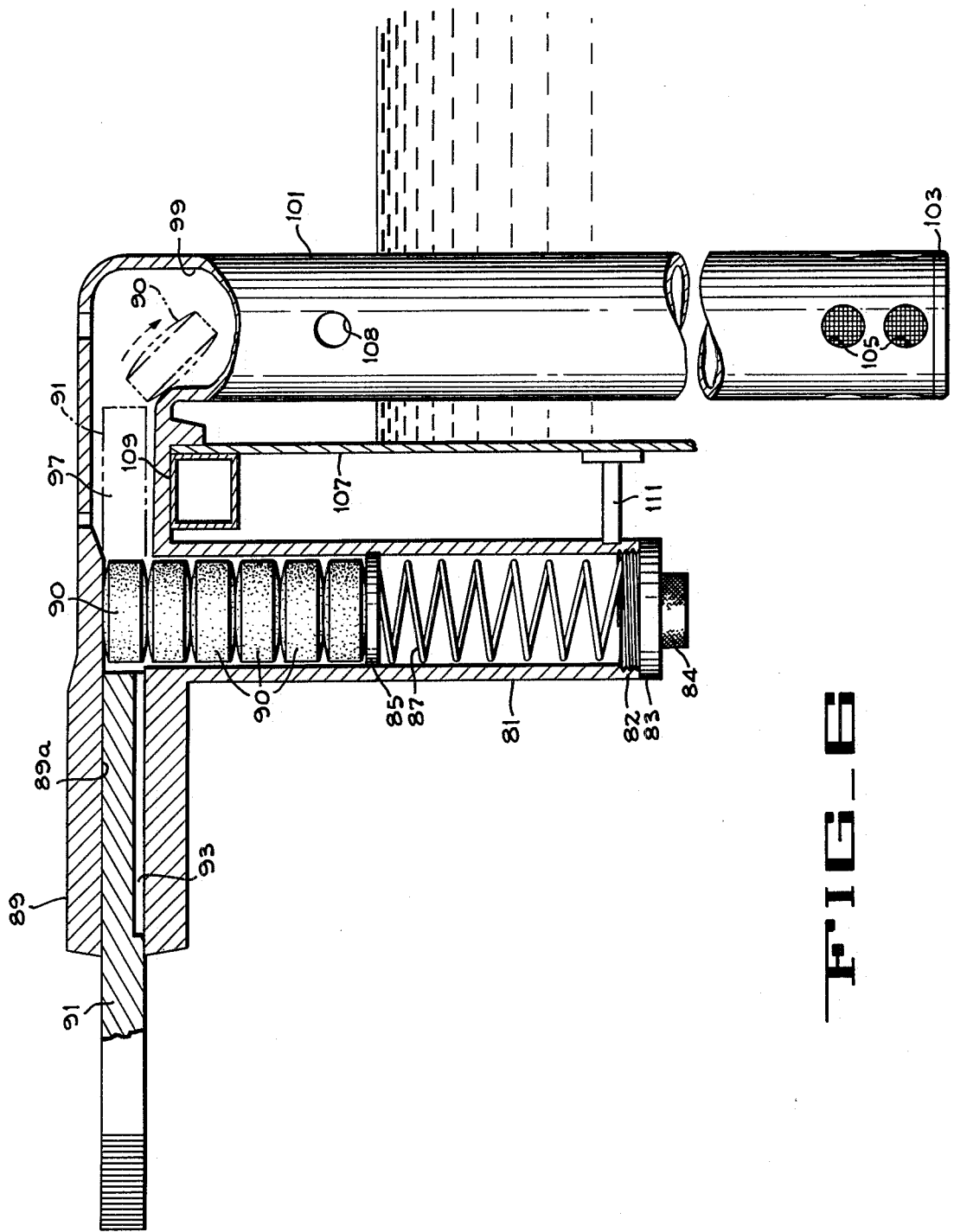

TABLET DISPENSER

BACKGROUND OF THE INVENTION

1. Field of the Invention

This invention pertains to chemical dispensers, and more particularly it pertains to storage units for dispensing tablets into liquid containers.

Measuring out chemicals periodically for deposit into containers, such as swimming pools, is an undesirable chore where powders and liquids are used. This has been partically alleviated in recent years by the development of chemicals in tablet form, each tablet containing a precise amount of one or more chemicals. Although the tablets are undeniably an improvement, certain inconveniences remain. First, the tablets, usually stored in a bottle-type container, must be removed from the container, carried to the pool, and deposited therein, allowing some contact with human hands. Second, unless the tablet container is locked away, which makes its daily retrieval even more troublesome, the tablets can also be retrieved by children and others who may be injured by contact with or consumption of the chemicals.

2. Summary of the Invention

The present invention overcomes these problems by providing a lockable poolside container which need be loaded with tablets, say, only twice per month, which may be moisture-proof, and which requires only a two-second operation to dispense a tablet into the pool.

The dispenser comprises a first, generally upright tube containing the tablets which are stacked on top of one another in serial fashion; a base lying in a horizontal plane connected to the first tube and including an elongated passageway along which a tablet may be moved; a plunger; or other means, to move a tablet from one end of the passageway to the other in the horizontal plane; a second, generally upright tube connected to the base at the other end of the passageway, the second tube being used to successively guide the tablets by gravity fall into the water in the pool; and means to mount the dispenser to the apron or side of the pool. The bottom end of the second tube is immersed in the water in the pool; it may be open-ended, or it may be closed so as to hold the tablets while allowing the water to enter and dissolve the tablets. Finally, the first tube may have a locking mechanism to insure that the tablets stored therein will not be handled by unauthorized persons.

A principal object of the present invention is to provide a device to introduce a precise, premeasured dosage of chemicals in tablet form into a container such as a swimming pool.

A second object of the present invention is to provide a poolside container for protected storage of water treatment tablets, whereby the tablets may be individually and quickly dispensed into the pool.

A third object of the present invention is to provide a poolside tablet dispenser which can be easily disengaged for maintenance and cleaning.

A fourth object of the present invention is to provide a poolside tablet dispenser with a minimum of moving parts for ease of maintenance.

BRIEF DESCRIPTION OF THE DRAWINGS

FIG. 1 is a broken side elevation partially in section of the dispenser of the present invention in its normal or "rest" position.

FIGS. 2 and 3 are broken side elevations partially in section of the dispenser of the present invention, such figures being similar to FIG. 1 but showing the dispenser in its "action" mode and respectively representing phases 1 and 2 of the apparatus movements in dispensing a tablet into the pool.

FIG. 4 is an isometric view of the underside of the dispenser of FIG. 1 particularly showing the poolside clip arrangement.

FIG. 5 is an exploded isometric view of the working components of the dispenser of FIG. 1 with a portion thereof being broken away.

FIG. 6 is a broken side elevation partially in section of a modified form of the dispenser of the present invention.

DESCRIPTION OF THE PREFERRED EMBODIMENT

As shown in FIGS. 1 and 5, the top part of the dispenser includes a removable hollow outer cylinder 11, of suitable length, which encloses a hollow inner cylinder 13 which is partly cut away along the lines 15, as shown in FIGS. 1 and 5, to allow easy access to the interior of the inner cylinder wherein the tablets 16 are stacked. The attached top 17 of the inner cylinder 13 has embedded in it an upwardly extending threaded stud 19, which may be of the same material as the top 17 and inner cylinder 13. A knob 21 is attached to the top 23 of the outer cylinder 11, which top is in turn attached to and a part of the outer cylinder. The knob 21 is journaled in and extends through the top 23, the interior end 25 of the knob being threaded as a nut to receive the threaded stud 19. When this mating of stud 19 and knob interior end 25 occurs, the outer cylinder 11 is locked onto and rigidly held in place around the inner cylinder 13, and the tablets contained therein cannot be reached by human hands, especially hands of inquisitive children. The outer cylinder 11, top 23 and knob 21 may be constructed of material, such as dark blue or purple-colored plastic, which filters out light that would cause deleterious chemical reactions in the tablets.

The inner cylinder 13 is attached to a rectangular base 27 (FIG. 4), which may be comprised of three base component parts 27a, 27b, and 27c as shown in the expoded view of FIG. 5. The upper base component 27a has a circular, shouldered aperture 29 (FIG. 1) of appropriate diameter so that the lower end 30 of the inner cylinder 13 is received and firmly held in place therein. The lower end 31 of the outer cylinder 11 merely rests upon the top of the upper base component 27a when the knob 21 and the stud 19 have mated.

The circular aperture 29 extends through the upper component 27a of the base, so that the tablets 16 (FIG. 1) stacked inside the interior cylinder 13 may pass through the base component 27a and be received within the middle base component 27b of the base. The base component 27b has an elongated passageway 33 extending most of the component length and extending from top to bottom of said component, as shown in FIG. 5. The passageway 33 is of sufficient width and height that a tablet 16 may move freely along the passageway from one end to the other.

A slide bar 35, which may be T-shaped so as to provide a readily accessible handle 35a, is mounted in the passageway 33 of the middle base component 27b so that the slide bar may be slidably reciprocated in the plane of said base component, said passageway acting as a guide (FIG. 5). The width of the slide bar 35, with the exception of the handle 35a, is slightly less than the width of the passageway 33. The passageway 33 abruptly narrows to a smaller width near one end of the base component 27b, as indicated at 37 (FIG. 5). With the exception of the handle 35a, a first portion of the slide bar 35 is of a width slightly less than the width of the passageway at the constriction 37 so as to pass through said constrictions, while the end portion of said slide bar is of a greater width slightly less than that of the wide portion of the passageway so as to slidably fit therein. The constrictions 37 act to stop the retracting movement of the slide bar 35 so that the slide bar cannot be returned so far as to become disengaged from the base component 27b.

The slide bar 35 has a rectangular depression 41 at one end thereof, as shown in FIGS. 2 and 5. At the depression end of the slide bar 35, the height of the interior end 43 of said slide bar is somewhat less than the height of a tablet 16. The depression area 41 in the slide bar serves three purposes. First, the height of the passageway 33 must be somewhat larger than the height of a tablet 16, in order that said tablet may slide freely in the direction indicated in FIG. 3 within the passageway; at the same time, the height of the interior end 43 of the slide bar should be less than the height of a tablet, so that the tablet 45 (FIG. 2) in the stack which is next to the bottommost tablet is not chipped or scraped by contact or friction with the slide bar 35. This is resolved by use of the depressed area 41 in the slide bar. Second, the slide bar makes no contact with the upper base component 27a (FIG. 5) in the depression area 41, so that friction is reduced during the tablet ejecting operation. Third, if the height of the passageway 33 is made slightly greater than the height of the largest tablet used therein, different sized tablets can be used. For each different height tablet, one merely changes the slide bar 35, replacing it with one whose height at the interior end 43 is related to tablet height as recited above.

The slide bar 35 may be further connected to the middle base component 27b by a spring (not shown) connecting the interior end 43 of said slide bar and the far end 47 (FIG. 5) of the passageway 33. The spring will force the slide bar to return to its rest position as shown in FIG. 1. The additional force required to move the slide bar from its rest position will discourage children from misusing the dispenser so as to dispense more tablets than are desired on a given day.

The middle base component 27b rests in turn upon a lower base component 27c which has a circular aperture 49 extending therethrough, of radius larger than the radius of a tablet 16, said aperture being located directly under the passageway 33 at the interior end thereof. The base component 27b has four vertical screw holes 51a, 51b, 51c and 51d drilled therethrough at the corners thereof, and at corresponding positions, the lower base component 27c has four vertical screw holes 53a, 53b, 53c and 53d drilled therethrough, all as shown in FIG. 5. Four screws 55 (only three being shown in FIG. 5) are inserted as shown and used to rigidly hold the three base components 27a, 27b and 27c in position relative to one another. The base is thus easily disassembled for cleaning, interchange of slide bar, storage, etc.

The entire dispenser assembly is arranged to be attached to the deck 67 of a pool by a U-shaped clip 69 that is bifurcated on the bottom, said clip being attached to the bottom of the lower base component 27c via screws 71 (FIG. 1). The bifurcated portion 73 of the clip is arranged to be inserted into a female clip 75 which, in turn, is attached to the pool deck 67 by screws 77 (FIG. 5). The U-shaped clip 69 utilizes as a locking device a pair of arrow-like projections 79 which catch and hold firmly in the female clip 75, as suggested in FIG. 4. The clip material is preferably some rigid material such as steel which allows limited bending. The arrow-like projections 79 are bent toward one another to insert or remove the U-shaped clip 69 from contact with the female clip 75.

A hollow cylinder 57 (FIG. 4), of appropriate chemical- and water-resisting material, such as plastic, and having an outer radius equal to the radius of the lower portion of the lower base component aperture 49 and an inner radius larger than that of the tablets 16, is inserted in said aperture 49 and thereby rigidly attached to the lower base component 27c as shown in FIGS. 1, 2 and 3. The cylinder 57 has a plurality of radially extending apertures 59 near the lower end thereof, as shown in FIG. 1-4, over which plastic screen is placed to allow influx and efflux of liquids from the pool. The bottom 61 (FIGS. 1-4) of the cylinder, also of chemical- and water-resistant material, may be solid or may have apertures 63 provided, over which further plastic screen wire is placed. The cylinder 57 also has radially extending apertures 65 provided at the upper end thereof above the level of the water in the pool to allow excess moisture and gas by-products in the air within the cylinder 57 to escape. The tablet 16, dispensed in FIG. 3, drops to the bottom of the cylinder 57 and is held there to be dissolved by and pass into the liquid. Said liquid, comprising the water in the pool, surrounds the lower part of said cylinder and enters the cylinder via the apertures 59 and 63.

With the exception of the U-shaped clip 69, the female clip 75 and the screws 55, 71 and 77, all parts of the dispenser may be constructed of plastic, preferably at least ¼ inch thick.

Operation of the dispenser is illustrated in FIGS. 1, 2 and 3. FIG. 1 represents the "rest" position of the dispenser. When a tablet is to be dispensed, the operator pulls back the slide bar 35 as far as it will travel, as shown in FIG. 2. This allows the lowermost tablet 16, originally resting in the depression area 41 of the slide bar, to drop into the passageway cavity in the base component 27b. The operator then pushes the slide bar 35 forward, which in turn moves the tablet 16 over the aperture 49 to cause it to drop to the bottom of the cylinder 57 as shown in FIG. 3. The entire operation requires no more than two seconds, and the apparatus contains only one moving part in operation, the slide bar 35.

FIG. 6 illustrates a second embodiment of the dispenser which may be used with free-standing pools of the "Doughboy" type where a standing protrusion above the pool liner is undesirable. A single, generally upright hollow cylinder 81 is used for storage of the tablets 90. This cylinder is interiorly threaded at the bottom end 82. A bottom enclosure 83 is provided with a threaded projection which mates with the threaded portion of the cylinder 81 to lock the bottom enclosure to the cylinder. A knob 84 is provided for loosening or tightening the bottom enclosure. The tablets 90 are loaded from the cylinder bottom and are urged upwardly by a plate 85 and spring 87 which are positioned below the tablets within the cylinder 81. The topmost tablet 90 comes to rest against the underside of an upper wall 89a of a base 89 which is formed integrally with the cylinder 81 and which functions in a manner generally similar to that of the base 27 of the previously described embodiment of the invention. A slide bar 91, with depression area 93 on the underside thereof, slidably reciprocates in the plane of the base 89 in a passageway 97 in the base to move the topmost tablet 90 from one end of the passageway to the other end thereof, said slide bar 91 being similar in structure and function to the slide bar 35 previously described. The interior end of the passageway 97 communicates with a vertically extending passage 99 within a second generally upright, hollow cylinder 101 that is formed integrally with the base 89 and projects downwardly therefrom at one end thereof so as to extend parallel to the first cylinder 81. The passage 99 within the second cylinder 101 is of sufficient size so that the tablet 90 will fall by gravity to the bottom of the second cylinder.

The dispenser may be attached to the side 107 and/or top 109 of the pool in any convenient manner. As shown in FIG. 6, the dispenser may be provided with a radially extending external support 111, attached near the bottom of the first cylinder 81, to make contact with the exterior side 107 of the pool so as to hold the first cylinder 81 in a position parallel to the side 107 while the underside of the base 89 between the cylinders 81 and 101 rests upon the pool top 109. The dispenser is positioned so that the first cylinder 81 lies outside the pool while the second cylinder 101 lies inside the pool with the water in the pool covering the lower portion of the second cylinder.

The second cylinder 101 may be bottomless, in which case any tablet 90 which falls along the passage therein will drop to the bottom of the pool. Alternatively, and as shown in FIG. 6, the second cylinder 101 may be provided with a removable bottom enclosure 103 to catch and hold the tablet 90. In this instance, the second cylinder 101 is also provided with radially extending apertures 105 near the bottom of the cylinder to allow the water in the pool to enter and dissolve the tablet held by the bottom enclosure 103. The cylinder 101 may also be provided with radially extending apertures 108 above the water line to allow the excess moisture and gas by-products to exit.

As a further modification (not shown), the water pressure surge, which occurs each time the pool filter pump is turned on, may be used to automatically dispense the tablets. According to this further modification, the slide bar (as shown in the FIG. 1 or FIG. 6 embodiments) is arranged to be connected to an actuating piston which moves forward in response to the surge of pressure of pump water which is incident upon the piston face, thus dispensing one tablet in the manner hereinbefore described. The piston and slide bar are spring-loaded so that the slide bar is returned to its normal rest position in the absence of this pumping pressure.

Although the best modes contemplated for carrying out the present invention have been shown and described herein, it will be apparent that modification and variation may be made without departing from what is regarded to be the subject matter of the invention.

We claim:

1. A tablet dispenser for association with a liquid container comprising a base having an elongated passageway therein,
    a tablet magazine secured to said base communicating with said passageway and extending vertically therefrom for holding a stack of tablets for gravital movement thereof toward and into said passageway,
    a pusher mounted for sliding movement in said passageway along a rectilinear path between tablet-receiving and tablet-rejecting positions,
    said pusher having its upper surface adjacent the forward end thereof cut away to define an elongated recess extending rearwardly therefrom defining a flat tablet support surface parallel to said rectilinear path,
    said pusher when in said tablet-receiving position being disposed along said path in said passageway with its said forward end adjacent said tablet magazine in unobstructing relation thereto, thereby to permit a lowermost tablet to gravitate into said passageway in front of said pusher,
    said pusher when advanced along said path toward said tablet-ejecting position being disposed in said passageway with said elongate recess underlying said tablet magazine thereby to receive and continuously support the next lowermost tablet without vertical movement thereof as the lowermost tablet is pushed to a discharge position,
    the height of said pusher forward end below said recess being less than the height of a tablet with the height of said passageway being greater than tablet height whereby said pusher forward and engages only the lowermost tablet in the stack.

2. The tablet dispenser of claim 1 wherein said base includes a tubular tablet discharge chamber depending therefrom and communicating with said passageway for gravital reception of a tablet therefrom when said pusher is in said tablet-ejecting position,
    said discharge chamber having an apertured wall therealong permitting influx and efflux of liquids and gases therethrough in connection with dissolving the discharged tablets.

3. The tablet dispenser of claim 1 wherein said tablet magazine is open along one side to facilitate loading of a vertical tablet stack therein,
    a cover for said magazine fully enclosing the same above said base, and
    means detachably securing said cover to said magazine.

* * * * *

UNITED STATES PATENT AND TRADEMARK OFFICE
CERTIFICATE OF CORRECTION

PATENT NO. : 4,129,230
DATED : December 12, 1978
INVENTOR(S) : Ronald J. Billett and Bruce M. Harper It is certified that error appears in the above-identified patent and that said Letters Patent are hereby corrected as shown below:

Column 6, line 17, "tablet-rejecting" should read -- tablet-ejecting --. Column 1, line 12, "partically" should read -- partially --. Column 2, lines 44-45, "expoded" should read -- exploded --.

Signed and Sealed this

Twenty-fifth Day of September 1979

[SEAL]

Attest:

LUTRELLE F. PARKER
*Attesting Officer*   *Acting Commissioner of Patents and Trademarks*